P. H. HERBERT.
OPHTHALMIC MOUNTING.
APPLICATION FILED JULY 17, 1919.
1,349,378.
Patented Aug. 10, 1920.
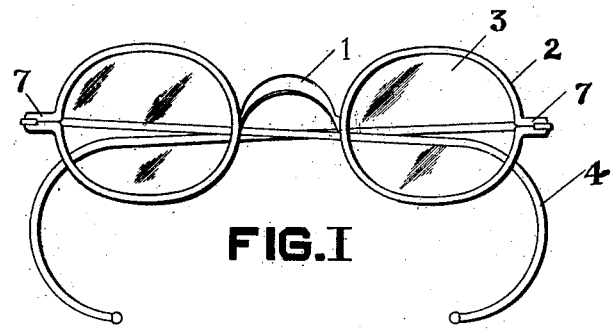
FIG.I
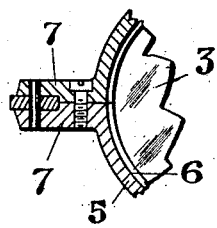
FIG.II
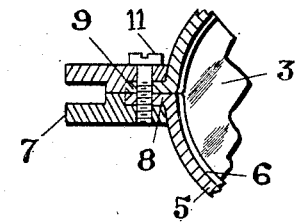
FIG.III
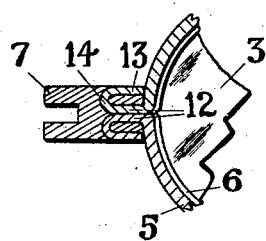
FIG.IV
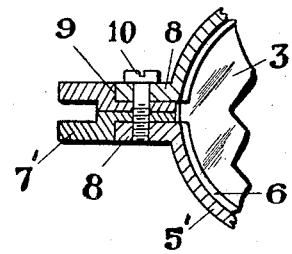
FIG.V
INVENTOR
PITT H. HERBERT.
BY
H. H. Styll, H. K. Parsons
ATTORNEYS

UNITED STATES PATENT OFFICE.

PITT H. HERBERT, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,349,378.  Specification of Letters Patent.  Patented Aug. 10, 1920.

Application filed July 17, 1919. Serial No. 311,400.

*To all whom it may concern:*

Be it known that I, PITT H. HERBERT, of Southbridge, in the county of Worcester and State of Massachusetts, have invented certain new and useful Improvements in Ophthalmic Mountings, of which the following is a specification.

This invention relates to new and useful improvements in ophthalmic mountings and more particularly to the lens holding frames, the main object of the present invention being the provision of a frame constructed of a continuous piece of metal having formed at its ends the usual end pieces between which the temples are secured.

A further object of the present invention is the provision of continuous eye wire being provided at its ends with the usual temple end pieces, said end pieces being integrally formed with the ends of the eye wire or connected therewith in such a manner as to provide smooth and unbroken surfaces.

A still further object of the present invention is the provision of a lens frame adapted to be connected with the temple end pieces in such a manner that the lens can be readily arranged within the frame or removed therefrom without disturbing the position of the temple arranged between the end pieces.

With the above and other objects in view the invention consists in the novel features of construction and combination and arrangement of parts hereinafter more fully set forth, pointed out in the claims and shown in the accompanying drawings, in which:

Figure I is a front elevation of a pair of spectacles constructed in accordance with my invention.

Fig. II is a transverse sectional view taken through the ends of the eye wire.

Fig. III is a similar view illustrating a modified form of the invention.

Fig. IV is a similar view illustrating still another form of the invention.

Fig. V is a similar view illustrating another form of the invention.

Referring now more particularly to the drawings in which the various reference characters designate the different parts throughout the several views, it will be noted that I employ the well known form of bridge indicated by the numeral 1, and secured at each end thereto are my improved lens frames 2, having lenses 3 arranged therein, and it is to be understood that any well known form of bridge or temples, which are indicated by the numeral 4, can be used in connection with my improved lens frame.

In the construction of my improved lens frame it will be noted in Fig. II that the frame is constructed of a single piece of material including the end pieces, and is indicated by the numeral 5, said frame or eye wire having a central groove 6 therein for the reception of the lens and is provided at each end with the usual temple end pieces 7 which are formed by compressing the ends of the eye wire into the desired shape for the temple end pieces.

It will be understood that in forming the lens frame of a single piece of material the same may be constructed of a round wire operated upon to provide for the groove 6 and thence having its ends flattened out and formed into the temple end pieces 7. It will be apparent from this construction that I have provided a simple lens frame formed of a single piece of material, the ends of which terminate in the temple end pieces, whereby the temples may be quickly and readily secured to the lens frame. Heretofore the usual construction of a lens frame is to provide first the eye wire or frame itself and then solder or otherwise secure the temple end pieces thereto, and it will be apparent from the foregoing that I have provided a novel idea in the construction of lens frames.

In Fig. V, I have illustrated a slightly modified form of construction of my improved lens frame, wherein the end pieces 7' are separable from the ends of the eye wire, the eye wire 5' being of a continuous piece and having its terminals disposed at right angles to form the ears 8 which are disposed within suitable recesses 9 formed upon the exterior of the end pieces at the inner ends thereof, and are securely held in place by means of the screw 10, which extends through the ears 8 and through the end pieces 7'. Particular attention is called to the fact that in this construction one end of the eye wire 5' may be detached from the end pieces by loosening the screw 10 so that the lens from within the eye wire may be quickly removed therefrom or a new lens placed therein. This method of removing the lens from the eye wire without disturbing the position of the temple is carried out by having both the opening in the end pieces and the opening in the ear 8 threaded so that when the screw 10 is turned sufficiently to release the ear 8 of one end of the eye wire this end may be quickly detached from the end pieces to permit of removal of the lens or the replacement of a new one.

In Fig. III, I have illustrated another modified form of the invention wherein the continuous eye wire is provided at its terminals with the angular ear portions 8 and said ear portions instead of being disposed upon the exterior of the end pieces are arranged within suitable recesses formed upon the inner faces of the end pieces and arranged in opposed relation so that the ears 8 may be readily disposed therein and securely retained in position by means of the screw 11 which extends therethrough.

In Fig. IV, I have illustrated a construction of the invention wherein the end pieces are provided at their inner ends with longitudinal grooves disposed upon the inner surfaces thereof, and similar grooves upon the outer faces; the inner grooves are indicated by the numeral 12, while the outer grooves are indicated by the numeral 13. In order to provide communication between the interior and exterior grooves a transverse opening 14 is formed in each of the end pieces. In securing the terminals of the eye wire 5 to the end pieces in this form of the construction the said terminals are extended through the openings 14 in the eye wires and then bent inwardly to be disposed within the grooves 12, while the extreme terminals are also bent downwardly into the grooves 13, the extreme terminals being disposed entirely within the grooves so as to leave a smooth and unbroken surface upon the exterior of the end pieces.

It will be apparent from this construction that the end pieces cannot be readily removed from the eye wire 5 but this form of the construction provides for a strong union between the eye wire and the temple end pieces.

From the above description taken in connection with the accompanying drawings it will be readily apparent that I have provided a simple and durable lens frame for ophthalmic mountings which may be either constructed of a single piece of material having the end pieces integrally formed therewith, or detachably connected as desired.

In Fig. V it will be noted that the form of the invention herein illustrated is such that the lens arranged within the frame 5' can be readily removed and a new one inserted therein without disturbing the position of the temple.

I claim:

1. A frame of the character described comprising an eye wire bent into shape to receive a lens, and terminating in outwardly deflected parallelly disposed end portions, an end piece member having an outer kerf to receive a temple, and having at its inner portion grooves to receive the outwardly deflected ends of the eye wire, means for securing a temple within the kerf, and means for securing the outwardly deflected eye wire ends in the grooves of the temple end piece member.

2. A device of the class described including a continuous eye wire having its ends projecting laterally from the lens receiving portion in parallel relation, end pieces having cut away portions at their inner ends to receive the ends of the eye wire, whereby the ends of the eye wire will be disposed flush with the upper and lower faces of the temple pieces, and means for connecting the ends of the eye wire with the temple pieces.

3. A device of the class described including an eye wire, a temple piece having a central recess therein, and further provided with exterior grooves, the ends of said eye wire being extended into the recess and thence extended outwardly and bent into the recesses, as and for the purpose set forth.

In testimony whereof I have affixed my signature in presence of two witnesses.

PITT H. HERBERT.

Witnesses:
ALICE G. HASKELL,
H. E. COLEMAN.